(12) United States Patent
Nara et al.

(10) Patent No.: US 9,112,829 B2
(45) Date of Patent: *Aug. 18, 2015

(54) DYNAMIC DISPLAY USING PUSHED STREAMED DATA

(71) Applicant: Thomson Reuters Global Resources, Baar (CH)

(72) Inventors: Vijay Nara, Princeton, NJ (US); Michael Russin, East Rockaway, NY (US); Sujan Akella, New York, NY (US); Laijun Xie, Harrison, NJ (US)

(73) Assignee: Thomson Reuters Global Resources, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,610

(22) Filed: Aug. 11, 2014

(65) Prior Publication Data

US 2014/0351325 A1 Nov. 27, 2014

Related U.S. Application Data

(60) Continuation of application No. 13/334,316, filed on Dec. 22, 2011, now Pat. No. 8,806,034, which is a division of application No. 11/758,076, filed on Jun. 5, 2007, now Pat. No. 8,108,527.

(60) Provisional application No. 60/811,519, filed on Jun. 5, 2006.

(51) Int. Cl.
*G06F 15/16* (2006.01)
*H04L 29/08* (2006.01)
*G06F 17/30* (2006.01)
*H04L 29/06* (2006.01)

(52) U.S. Cl.
CPC ............ *H04L 67/02* (2013.01); *G06F 17/3089* (2013.01); *G06F 17/30899* (2013.01); *H04L 65/4084* (2013.01); *H04L 65/608* (2013.01); *H04L 67/26* (2013.01); *H04L 67/2819* (2013.01)

(58) Field of Classification Search
CPC .......................... H04L 67/02; G06F 17/30899
USPC .................................................. 709/231, 202
See application file for complete search history.

(56) References Cited

U.S. PATENT DOCUMENTS

| | | |
|---|---|---|
| 6,412,009 B1 | 6/2002 | Erickson et al. |
| 6,631,417 B1 | 10/2003 | Balabine |
| 6,754,621 B1 | 6/2004 | Cunningham et al. |
| 7,216,172 B2 | 5/2007 | Yang et al. |
| 2002/0059371 A1 | 5/2002 | Jamail et al. |
| 2002/0161853 A1 | 10/2002 | Burak |
| 2003/0067480 A1 | 4/2003 | Gao et al. |
| 2003/0101235 A1 | 5/2003 | Zhang |
| 2003/0217130 A1 | 11/2003 | Tang et al. |
| 2004/0003287 A1 | 1/2004 | Zissimopoulos et al. |
| 2004/0093327 A1 | 5/2004 | Anderson et al. |
| 2004/0177148 A1 | 9/2004 | Tsimelzon |
| 2005/0044242 A1 | 2/2005 | Stevens et al. |
| 2005/0160141 A1 | 7/2005 | Galley et al. |
| 2006/0064467 A1 | 3/2006 | Libby |
| 2006/0080674 A1 | 4/2006 | Bes et al. |
| 2006/0173997 A1 | 8/2006 | Tullberg et al. |
| 2006/0190563 A1 | 8/2006 | Vann |
| 2006/0253584 A1 | 11/2006 | Dixon et al. |

*Primary Examiner* — Hieu Hoang

(57) ABSTRACT

A system and method for dynamic updating of display windows using a pushed stream of data.

5 Claims, 3 Drawing Sheets

DYNAMIC DISPLAY USING PUSHED STREAMED DATA

CROSS-REFERENCE TO RELATED APPLICATIONS

This application is a continuation of, and takes priority from, co-pending U.S. patent application Ser. No. 13/334,316, filed Dec. 22, 2011, which is a divisional of, and takes priority from, U.S. patent application Ser. No. 11/758,076, filed Jun. 5, 2007, now U.S. Pat. No. 8,108,527, which claims benefit of U.S. Provisional application Ser. No. 60/811,519, filed Jun. 5, 2006, from which priority is asserted, and the contents of which are herein incorporated by reference in their entirety.

BACKGROUND OF THE INVENTION

1. Field of the Invention

The present invention generally relates to a system and method for dynamic updating of display windows using a pushed stream of data.

2. Description of the Related Art

There is a vast area of information sources available today. In many instances that real differentiation to a consumer between each of these sources relates to the "freshness" of the data provided. This is particularly true when the data may change moment to moment.

Existing distributed network tools for analyzing data often employ delayed or historical data. Such tools when monitoring constantly changing data may produce analyses that are less than accurate. For example, systems that display financial data on a periodic refresh schedule, may lead a user to make erroneous decisions pertaining to a financial transaction, resulting in substantial financial losses. The continual display of stale data may over time reduce a user's confidence to an extent that the continuing quest for the data from an information source may be terminated.

The real-time distribution of rapidly changing data via other modes of communication, such as by wireless devices such as cell phones, has been shown to be very useful in a number of contexts. Real-time access to information is a goal of many technological companies. For example, the real-time provision of financial information has been shown to be highly desired by many investors, with numerous entities being consumers of such services of Reuters world wide that provide real-time financial information at client sites in a controlled network.

The so-called Internet is a widely distributed decentralized network. The World Wide Web makes a system of internet servers that support documents in HyperText markup Language ("HTML") which support links to other documents. Web pages may contain hypertext links that are used to connect to any combination of graphics, audio, video and text, in a non-linear or non-sequential manner HyperText Transfer Protocol ("HTTP") references the underlying protocol employed by the World Wide Web, a protocol that defines how messages are formatted and transmitted and what actions Web servers and browsers should take in response to various commands. HTTP is a stateless protocol wherein each command is executed independently without any knowledge of the commands that came before. An HTTP client initiates a request by establishing a Transmission Control Protocol (TCP) connection to a particular port on a remote host (port 80 by default). An HTTP server listening on that port waits for the client to send a Request Message. The HTTP specification, such as HTTP/1.1 (RFC 2068), designates the rules for transfer. Web pages are obtained at Web servers by use of the Uniform Resource Locator, the global address of resources on the World Wide Web.

HTTP specification 1.1, dated January 1997, referred to as HTTP/1.1 (RFC 2068), the specification of which is hereby incorporated by reference, permits a chunking option. The chunking option refers to a transfer coding implementation that allows a body of a message to be transferred as a series of chunks, so-called "chunked data." Each chunked data is sent with its own size indicator, followed by an optional footer containing entity-header fields. Chunking envisions sending along with the entire message the size of the message.

As the World Wide Web has become the source of information for many consumers, including those seeking financial information, it would be advantageous if persons could access real-time, dynamic data, such as financial data, over a widely distributed network as the Internet, in particular using the World Wide Web.

Dynamic content has been allowed to be created in Web pages using the Common Gateway Interface (CGI). CGI calls or procedures enable applications to generate dynamically created HTML output, thus creating Web pages with dynamic content. However, retrieval of data is linked to when the Web page is invoked.

Some have suggested taking advantage of the HTTP protocol to cause a true stream of dynamic data. U.S. Pat. No. 6,754,621 to Cunningham et al. discloses prolonged streaming of data is achievable by specifying a reasonably large value as the content-length of the HTTP response packet. Data streaming may be continued when the transmitted data reaches the specified length when a new request/response exchange is initiated such that streaming of the financial data carries on from the point it left off. U.S. Pat. No. 6,412,009 to Erickson et al. utilizes a chunking option specified in the HTTP specification 1.1, dated January 1997 to send a series of HTTP messages with embedded session-oriented data between the Web server and the Web client without sending an end chunk message to cause the connection to remain active to series of interleaved HTTP messages between the Web server and the Web client, thereby creating an HTTP tunnel that is persistent for the duration of the communication between the host system and the Web client. (forming a persistent virtual connection between two endpoints of the connection-oriented protocol). U.S. Patent Publication No. 20020161853 To Burak et al. also discloses a real-time financial charting system of stock market pricing information over a browser-only interface by obtaining data pushed from a server over the World Wide Web making use of HTTP tunneling.

SUMMARY OF THE INVENTION

There is provided a method for dynamically sending pushed streamed data through a web-based system, said method comprising: (a) chunking the data as per HTTP specifications; (b) setting the chunk response size in the header to a non-specified value; (c) transmitting the chunked data to a web-based client.

Further embodiments included:

A method for dynamically displaying data through a web-based system, the method comprising: (a) establishing a connection with a web server; (b) receiving from said web server a pushed streamed set of HTTP conforming signals lacking a specified HTTP stop to the signal; (c) dynamically displaying the pushed streamed set of signals. Optionally such system employs, at the client side, JavaScript to establish the streaming connection.

As would be understood by one of ordinary skill in the art, wherein the term "JavaScript" is used herein, other types of executable programs having similar functionality could be used.

A method in a HTTP protocol based system comprising a proxy server connected over secure lines to more than one web server, and over the world wide web to one or more client browsers, said method comprising the steps of: (a) receiving at the proxy server a request signal from a client browser seeking financial data; (b) searching at the proxy server said more than one web servers to obtain relevant financial information to said request; (c) generating at said proxy server a pushed streamed set of HTTP conforming signals without a specified stop to the signal; (d) continually streaming financial data related to said request until the client is disconnected from the HTTP protocol based system.

Method embodiments proffer the advantage of permitting streaming behavior wherein the web applications is updated in real-time without user refresh. Further, embodiments permit dynamic screen updates of web applications. Static web pages can be converted into dynamic pages by including keywords therein.

DETAILED DESCRIPTION OF THE INVENTION

The present invention generally relates to a system and method for dynamic updating of display windows using a pushed stream of data.

Figure 1:
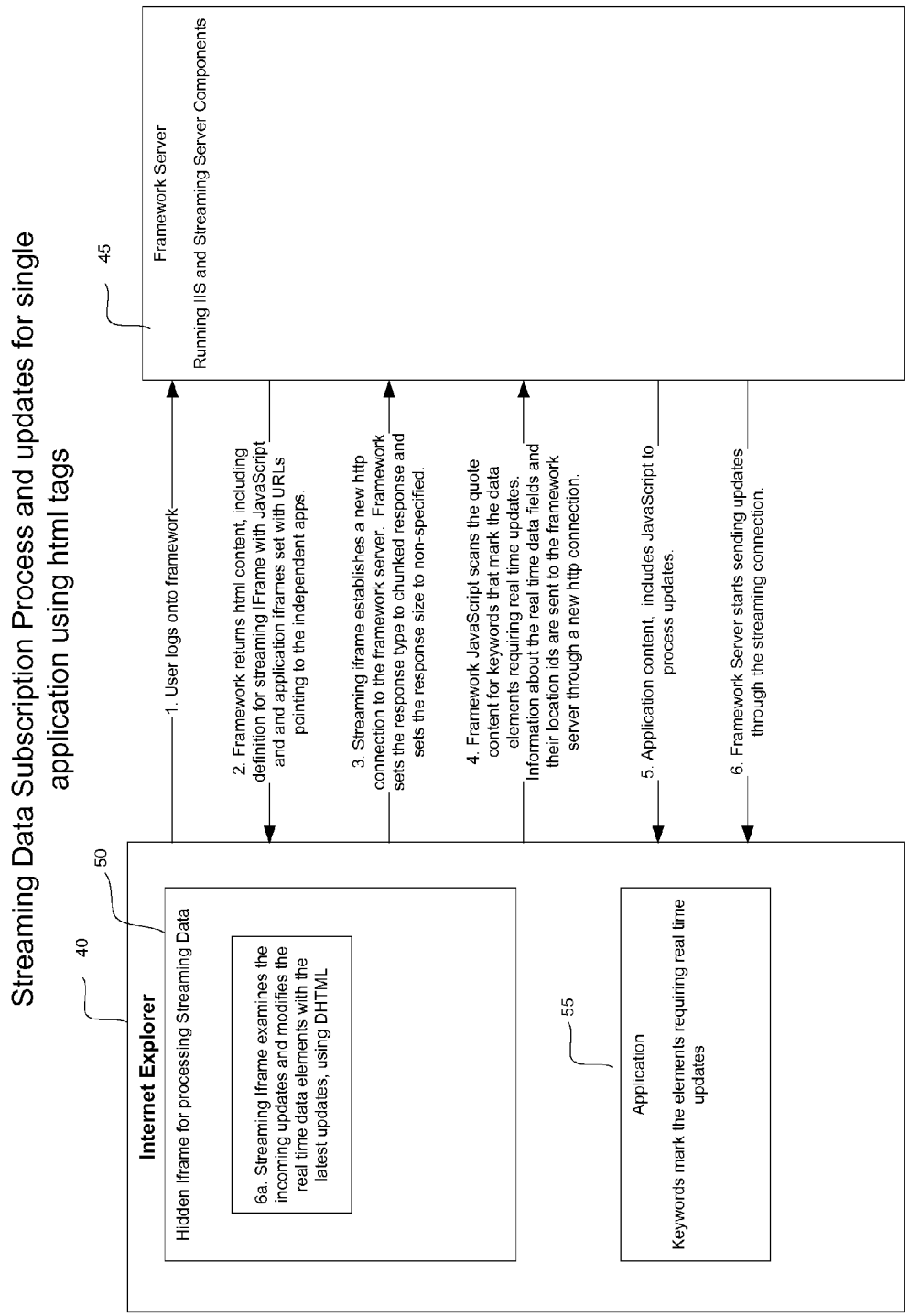
FIG. 1 is a flow chart representation of the Streaming Data Subscription Process of the present invention.

Turning to FIG. 1, there is shown an exemplary streaming data subscription process and update method for a single application using html tags. At step 1 user logs onto the framework server 45 via Internet Explorer 40 or other browser. At step 2 framework server 45 returns html content, including the definition for a streaming Iframe with Javascript. Application Iframes in such example with URLs pointing to the independent applications. At step 3, the streaming Iframe establishes a new http connection to the framework server 45. The framework sets the response type to chunked response and sets the response size to a non-specified value. This will leave the connection open. At step 4, once the application Iframe receives the response, framework JavaScript scans the quote content for keywords that mark the data elements requiring real time updates. Information about the real time data fields and their location ids are sent to the framework server. At step 5, the application content includes JavaScript to process the updates. The application registers the JavaScript function call with the streaming Iframe. The framework server 45 starts sending updates to browser 40 through the streaming connection at step 6 to hidden Iframe for processing streaming data 50. Hidden Iframe 50 at step 6a, examines the incoming updates, notices the registered JavaScript callback and calls the callback with the new data. This mechanism may be used by applications that show cumulative data, for example a charting application. In application 55, keywords mark the elements requiring real time updates.

Figure 2:
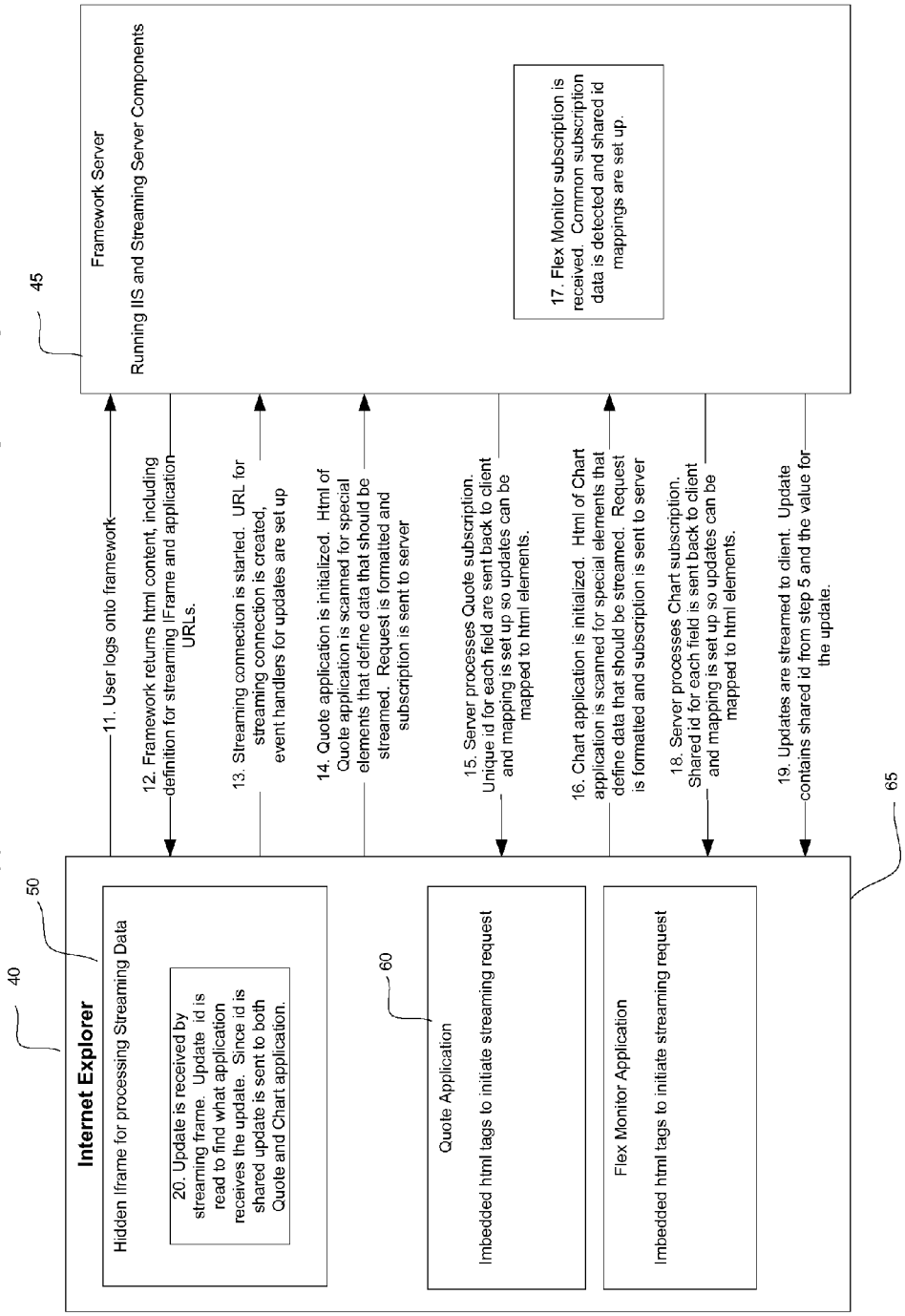
FIG. 2 is a continuation of the flow chart representation of the Streaming Data Subscription Process shown in FIG. 1 of the present invention.

Turning to FIG. 2, there is shown an exemplary streaming data subscription process and update method for multiple applications with shared data using html tags. As in FIG. 2, the process starts at step 11 by the user logging into framework server 45. The framework then returns at step 12 html content, including definition for the streaming Iframe with Javascript and application Iframes set with URLS pointing to the independent applications. The streaming Iframe establishes a new http connection at step 13 to the framework server 45 which sets the response type to chunked response and sets the response size to a non-specified value. This will leave the connection open. At step 14 the quote application is initialized. The html of the quote application is scanned for special elements that define data that should be streamed. The request is then formatted and the subscription sent to the server. The server process the quote subscription at step 15. A unique id for each field is sent back to the client and mapping is set up such that updates can be mapped to html elements. At step 16, the Flex Monitor application is initialized. The html of the chart application is scanned for special elements that define data that should be streamed, and the request is formatted and the subscription sent to the server. The Flex monitor subscription is received at the framework server at 17 with common subscription data being detected and shared id mappings set up. The server processes the chart subscription at step 18, the shared id for each field is sent back to the client, and mapping is set up such that updates can be mapped to html elements. Updates are then streamed to the client at step 19, with the update containing shared id from step 8 and the value for the update. The streaming Iframe at 20 examines the incoming updates, notices that the update applies to multiple applications and modifies the real time data elements in all the applications with the latest updates using, for example, DHTML.

Figure 3:
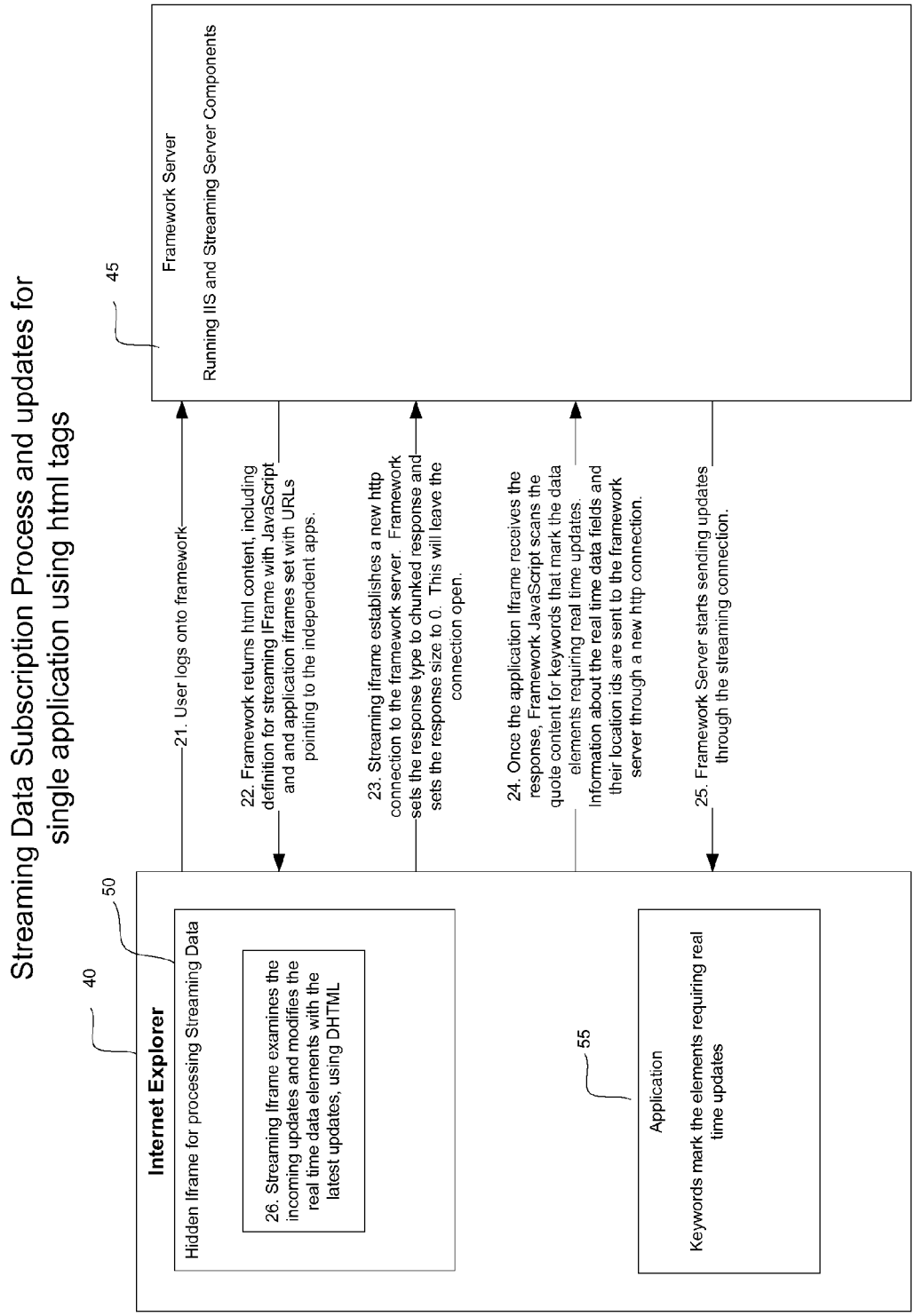
FIG. 3 is a further continuation of the flow chart representation of the Streaming Data Subscription Process shown in FIG. 1 of the present invention.

And further turning to FIG. 3, there is shown an exemplar streaming data subscription process with updates for single application using html tags. In the exemplary process, the user logs into framework server 45 at 21, and the framework at 22 returns html content, including the definition for the streaming Iframe with Javascript. The application Iframes are set with URLs pointing to the independent applications. At 23 the streaming Iframe establishes a new http connection to the framework server 45, and the framework sets the response type to chunked response and set the response size to a non-specified value. This will leave the connection open. Once the application Iframe receives the response at 24, framework JavaScript scans the quote content for keywords that mark the data elements requiring real time updates. Information about the real time data fields and their locations ids are sent to the framework server 45 through a new http connection. In step 25 the framework server starts sending updates through the streaming connection. At 26, the streaming Iframe examines the incoming updates and modifies the real time data elements with the latest updates, using, for example, DHTML. As shown, at the application level 55, keywords mark the elements requiring real time updates.

Statement Regarding Preferred Embodiments

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

The invention claimed is:

1. A Hypertext Transfer Protocol (HTTP) based system comprising:
a proxy server connected to more than one web servers and a client, wherein the proxy server
receives a request from the client seeking financial data from the more than one web servers over a first HTTP connection between the proxy server and the client,
searches the more than one web servers to obtain the financial data according to the request,
returns to the client a definition for a streaming IFrame for establishing a second HTTP connection between the proxy server and the client,
generates a pushed streamed set of HTTP responses including the financial data from the more than one web servers with a response size of the financial data set to a nonspecified value, and
continually pushes over the second HTTP connection the financial data included in the pushed streamed set of HTTP responses from the proxy server to the client in response to the request and updating the financial data for presenting at the client in real-time without requiring user refresh at the client until the client is disconnected from the HTTP based system.

2. The Hypertext Transfer Protocol (HTTP) based system of claim 1, wherein at least one of the more than one web servers is a World Wide Web server.

3. The Hypertext Transfer Protocol (HTTP) based system of claim 1, wherein the proxy server further
receives information about real time data fields and their location through the second HTTP connection, and
returns to the client the definition for the streaming IFrame for registering the pushed streamed set of HTTP responses with a JavaScript function call.

4. The Hypertext Transfer Protocol (HTTP) based system of claim 1, wherein the pushed streamed set of HTTP responses generated at the proxy server relates to securities market transaction data.

5. The Hypertext Transfer Protocol (HTTP) based system of claim 1, wherein the pushed streamed set of HTTP responses including the financial data are formatted with one or more keywords marking one or more elements of the financial data for updating.

* * * * *